(12) United States Patent
Watanabe et al.

(10) Patent No.: US 6,370,872 B1
(45) Date of Patent: Apr. 16, 2002

(54) EXHAUST GAS PURIFIER FOR INTERNAL COMBUSTION ENGINE

(75) Inventors: Takashi Watanabe; Koichi Hoshi, both of Susono; Kazuhiro Sakurai, Gotenba, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/579,253

(22) Filed: May 25, 2000

(30) Foreign Application Priority Data

May 26, 1999 (JP) .......................................... 11-147137

(51) Int. Cl.[7] ................................................ F01N 3/00
(52) U.S. Cl. ............................. 60/288; 60/277; 60/297
(58) Field of Search .......................... 60/274, 277, 287, 60/288, 297, 276, 286

(56) References Cited

U.S. PATENT DOCUMENTS

| | | | | |
|---|---|---|---|---|
| 5,355,672 A | * | 10/1994 | Adamczyk, Jr. et al. ...... | 60/288 |
| 5,357,749 A | * | 10/1994 | Ohsuga et al. ................. | 60/274 |
| 5,396,764 A | * | 3/1995 | Rao et al. ...................... | 60/287 |
| 5,467,594 A | | 11/1995 | Aoki et al. | |
| 5,524,433 A | * | 6/1996 | Adamczyk, Jr. et al. ...... | 60/297 |
| 5,613,359 A | | 3/1997 | Zahn et al. | |
| 5,625,750 A | * | 4/1997 | Puskorius et al. ............. | 60/274 |
| 5,693,877 A | * | 12/1997 | Ohsuga et al. ................. | 60/287 |
| 5,713,198 A | * | 2/1998 | Aoki et al. .................... | 60/277 |
| 5,765,369 A | * | 6/1998 | Tanaka et al. ................. | 60/277 |
| 5,787,705 A | * | 8/1998 | Thoreson ....................... | 60/274 |
| 5,798,270 A | * | 8/1998 | Adamczyk, Jr. et al. ...... | 60/297 |
| 5,946,906 A | * | 9/1999 | Akazaki et al. ............... | 60/288 |
| 6,092,368 A | * | 7/2000 | Ishii et al. ..................... | 60/277 |
| 6,112,520 A | * | 9/2000 | Kaiho et al. ................... | 60/286 |
| 6,158,212 A | * | 12/2000 | Tanaka .......................... | 60/287 |
| 6,253,547 B1 | * | 7/2001 | Watanabe et al. ............. | 60/274 |

FOREIGN PATENT DOCUMENTS

| | | |
|---|---|---|
| JP | 4-17710 | 1/1992 |
| JP | 5-321648 | 12/1993 |
| JP | 6-74021 | 3/1994 |
| JP | 6-93846 | 4/1994 |
| JP | 6-257424 | * 9/1994 |
| JP | 10-61426 | 3/1998 |

* cited by examiner

Primary Examiner—Thomas Denion
Assistant Examiner—Tu M. Nguyen
(74) Attorney, Agent, or Firm—Kenyon & Kenyon

(57) ABSTRACT

It is an object of the present invention to effectively utilize the performance of an adsorbent by providing an art for controlling flow of exhaust gas to the adsorbent in accordance with a mode in which unburnt fuel components discharged from an internal combustion engine reach the adsorbent or a mode in which the unburnt fuel components adsorbed by the adsorbent are desorbed therefrom. An exhaust gas purifier for an internal combustion engine in accordance with the present invention includes an exhaust passage connected to the internal combustion engine and partially formed of a main exhaust passage and a bypass passage bypassing the main exhaust passage, an adsorbent disposed in the bypass passage, a flow passage switching unit for switching the flow of the exhaust passage to the main exhaust passage and the bypass passage, a reaching mode prediction unit for predicting a mode in which unburnt fuel components reach the adsorbent from the internal combustion engine, and a switching control unit for controlling the flow passage switching unit in accordance with the predicted mode.

5 Claims, 9 Drawing Sheets

EXHAUST GAS PURIFIER FOR INTERNAL COMBUSTION ENGINE

BACKGROUND OF THE INVENTION AND CONVENTIONAL ART

The present invention relates to an art for purifying exhaust gas discharged from an internal combustion engine installed in a motor vehicle or the like. In an internal combustion engine installed in a motor vehicle or the like, an exhaust gas purification catalyst is disposed in the midst of an exhaust passage for the purpose of purifying noxious gas components in exhaust gas. As an example of such an exhaust gas purification catalyst, there is known a three-way catalyst having a noble metal catalytic substance of platinum-rhodium type carried on a surface of a ceramic carrier coated with alumina. When the air-fuel ratio of the exhaust gas flowing into the three-way catalyst is in the vicinity of a stoichiometric air-fuel ratio, the three-way catalyst causes hydrocarbon (HC) and carbon monoxide (CO) contained in exhaust gas to react with oxygen ($O_2$) in exhaust gas to be oxidized into water ($H_2O$) and carbon dioxide ($CO_2$), and at the same time, causes nitrogen oxides (NOx) contained in exhaust gas to react with hydrocarbon (HC) and carbon monoxide (CO) in exhaust gas to be reduced into water ($H_2O$), carbon dioxide ($CO_2$) and nitrogen ($N_2$).

The three-way catalyst as mentioned above makes it possible to purify the unburnt HC, CO and NOx contained in exhaust gas, whereby those noxious gas components are prevented from being discharged. The three-way catalyst is activated at a temperature equal to or higher than a predetermined activation temperature (e.g. 300to 500° C.) and becomes capable of purifying noxious gas components in exhaust gas. However, when the three-way catalyst is at a temperature lower than the activation temperature, it is inactive and thus incapable of purifying noxious components in exhaust gas.

In particular, for example, if the internal combustion engine has been cold-started, the fuel injection amount is increased more than usual for the purpose of enhancing the startability of the internal combustion engine, ensuring driveability and so on. Meanwhile, since the combustion in the internal combustion engine is destabilized, the amount of unburnt fuel components (e.g. HC) contained in exhaust gas is relatively large. In this case, if the three-way catalyst is inactive, there arises an inconvenience in that a relatively large amount of unburnt HC is discharged into the atmosphere without being purified.

To solve such a problem, there is proposed, for example, an engine exhaust gas purifier as disclosed in Japanese Patent Application Laid-Open No. HEI 4-17710. The engine exhaust gas purifier disclosed in this publication includes a bypass passage bypassing part (a main exhaust passage) of an exhaust passage downstream of an exhaust gas purification catalyst, adsorption means installed in the bypass passage, and a flow passage switching valve which allows exhaust gas to pass through the bypass passage only when the exhaust gas is at a low temperature lower than a predetermined temperature and shuts off flow of exhaust gas in the bypass passage upon generation of a signal relating to a sudden change in operational state.

The engine exhaust gas purifier thus constructed blocks the main exhaust passage when the exhaust gas temperature is lower than a predetermined temperature, and at the same time, controls the flow passage switching valve to open the bypass passage, thus causing the unburnt HC that has not been purified in the exhaust gas purification catalyst to be adsorbed by the adsorption means.

When the exhaust gas temperature is equal to or higher than a predetermined temperature, the engine exhaust gas purifier predicts that unburnt HC is discharged from the adsorption means, and opens the main exhaust passage. At the same time, the engine exhaust gas purifier controls the flow passage switching valve so that the bypass passage is shut off, thus preventing the unburnt HC discharged from the adsorption means from being discharged into the atmosphere.

In addition, if the operational state of the internal combustion engine has abruptly changed, for example, into high-load operation when the exhaust gas temperature is equal to or lower than a predetermined temperature, the aforementioned engine exhaust gas purifier opens the main exhaust passage and controls the flow passage switching valve so that the bypass passage is shut off. Thereby unburnt HC is prevented from being desorbed from the adsorption means, and the exhaust gas resistance is reduced.

In the aforementioned engine exhaust gas purifier, since the flow passage switching means is controlled only in consideration of an abrupt change in operational state of the engine and a temperature of exhaust gas, the following inconveniences may arise. For example, the heavier the property of the fuel burnt in the internal combustion engine becomes, the easier it becomes for unburnt HC to adhere to a wall surface of the exhaust passage or the exhaust gas purification catalyst. Hence, it takes a long time until the unburnt HC discharged from the internal combustion engine reaches the adsorbent. Thus, there is a concern that the unburnt HC might be discharged into the atmosphere through the main exhaust passage after flow of exhaust gas through the bypass passage has been blocked.

If the exhaust gas purification catalyst has deteriorated, especially if the low-temperature activation ability of the exhaust gas purification catalyst has deteriorated, it takes a long time until the exhaust gas purification catalyst is activated, and over a long period of time, unburnt HC is discharged from the exhaust gas purification catalyst without being purified. Therefore, there is a concern that unburnt HC might be discharged from the exhaust gas purification catalyst after flow of exhaust gas through the bypass passage has been blocked, and that the unburnt HC might be discharged into the atmosphere through the main exhaust passage.

The present invention has been made in consideration of the aforementioned problems. It is an object of the present invention to effectively utilize the performance of an adsorbent and improve exhaust emission properties, by providing an art for controlling flow passage switching means in accordance with a mode in which unburnt fuel components discharged from an internal combustion engine reach the adsorbent or a mode in which the unburnt fuel components adsorbed by the adsorbent are desorbed from the adsorbent, in an exhaust gas purifier for the internal combustion engine having a main exhaust passage communicating with the internal combustion engine, a bypass passage bypassing the main exhaust passage, the adsorbent disposed in the bypass passage, and the flow passage switching means for switching flow of exhaust gas into the main exhaust passage and the bypass passage.

SUMMARY OF THE INVENTION

With a view to solving the aforementioned problem, the present invention has taken the following measure. That is, an exhaust gas purifier for an internal combustion engine includes an exhaust passage connected to the internal combustion engine and partially formed of a main exhaust passage and a bypass passage bypassing the main exhaust passage, an adsorbent which is disposed in the bypass passage and adsorbs unburnt fuel components in exhaust gas, flow passage switching means for switching flow of exhaust gas to the main exhaust passage and the bypass passage, reaching mode prediction means for predicting a mode in which unburnt fuel components reach the adsorbent from the internal combustion engine, and switching control means for controlling the flow passage switching means in accordance with the mode predicted by the reaching mode prediction means.

In the exhaust gas purifier thus constructed, when unburnt fuel components contained in the exhaust gas discharged from the internal combustion engine need to be adsorbed by the adsorbent, the flow passage switching means operates so that the entire exhaust gas discharged from the internal combustion engine flows into the bypass passage. If it becomes unnecessary to cause the unburnt fuel components contained in the exhaust gas discharged from the internal combustion engine to be adsorbed by the adsorbent, the flow passage switching means is switched from the state where the entire exhaust gas flows into the bypass passage, and operates so that the entire exhaust gas or most of the exhaust gas flows into the main exhaust passage.

At this moment, the reaching mode prediction means predicts a mode in which the unburnt fuel components to be adsorbed by the adsorbent reach the adsorbent. The switching control means controls a timing for switching the flow passage switching means based on the mode predicted by the reaching mode prediction means.

That is, the flow passage switching means switches the flow passage after all the unburnt fuel components to be adsorbed by the adsorbent have reached the adsorbent.

Consequently, there is no possibility that the flow passage be switched before all the unburnt fuel components to be adsorbed by the adsorbent reach the adsorbent or that the flow passage be switched with an undue delay after all the unburnt fuel components to be adsorbed by the adsorbent have reached the adsorbent.

The exhaust gas purifier in accordance with the present invention may further include fuel property judgement means for judging a property of fuel burnt in the internal combustion engine, and may be designed so that the reaching mode prediction means predicts a reaching mode of unburnt fuel components using the property of fuel judged by the fuel property judgement means as a parameter.

The reason for employing this construction is as follows. The heavier fuel becomes, the easier it becomes for unburnt fuel components to adhere to the exhaust passage or the like upstream of the adsorbent. Thus, it takes a long time until all the unburnt fuel components to be adsorbed by the adsorbent reach the adsorbent. Therefore, it is necessary to retard the timing for switching the flow passage accordingly.

Also, the exhaust gas purifier in accordance with the present invention may further include exhaust gas purification means disposed in the exhaust passage upstream of the adsorbent to purify at least unburnt fuel components contained in exhaust gas, and deterioration degree judgement means for judging a degree of deterioration of the exhaust gas purification means, and may be designed so that the reaching mode prediction means predicts a reaching mode of unburnt fuel components using the degree of deterioration judged by the deterioration degree judgement means as a parameter.

The reason for employing this construction is as follows. If the low-temperature activation ability of the exhaust gas purification means deteriorates, it takes a long time until the exhaust gas purification means which is at a low temperature and inactive, and over a long period of time, unburnt fuel components are discharged from the exhaust gas purification means without being purified. Therefore, it is necessary to retard the timing for switching the flow passage accordingly.

Next, an exhaust gas purification catalyst in accordance with the present invention may be characterized by including an exhaust passage connected to the internal combustion engine and partially formed of a main exhaust passage and a bypass passage bypassing the main exhaust passage, an adsorbent which is disposed in the bypass passage and adsorbs unburnt fuel components in exhaust gas at a temperature lower than a predetermined temperature, flow passage switching means for switching flow of exhaust gas to the main exhaust passage and the bypass passage, reaching mode prediction means for predicting a mode in which unburnt fuel components reach the adsorbent from the internal combustion engine, desorption mode prediction means for predicting a mode in which the unburnt fuel components adsorbed by the adsorbent are desorbed, and switching control means for controlling the flow passage switching means in accordance with the mode predicted by the reaching mode prediction means and the desorption mode prediction means.

In the exhaust gas purifier thus constructed, when the unburnt fuel components contained in the exhaust gas discharged from the internal combustion engine need to be adsorbed by the adsorbent, the flow passage switching means operates so that the entire exhaust gas discharged from the internal combustion engine flows into the bypass passage. If it becomes unnecessary to cause the unburnt fuel components contained in the exhaust gas discharged from the internal combustion engine to be adsorbed by the adsorbent, or if the unburnt fuel components adsorbed by the adsorbent are desorbed, the flow passage switching means is switched from the state where the entire exhaust gas flows into the bypass passage and operates so that the entire exhaust gas or most of the exhaust gas flows into the main exhaust passage.

The reaching mode prediction means predicts a mode in which the unburnt fuel components to be adsorbed by the adsorbent reach the adsorbent, and the desorption mode prediction means predicts a mode in which the unburnt fuel components adsorbed by the adsorbent are desorbed.

The switching control means controls a timing for switching the flow passage switching means based on the modes predicted by the reaching mode prediction means and the desorption mode prediction means.

That is, the flow passage switching means switches the flow passage when all the unburnt fuel components to be adsorbed by the adsorbent reach the adsorbent, or when the unburnt fuel components adsorbed by the adsorbent start being desorbed.

Consequently, there is no possibility that the flow passage be switched before all the unburnt fuel components to be adsorbed by the adsorbent reach the adsorbent or that the flow passage be switched with an undue delay after all the unburnt fuel components to be adsorbed by the adsorbent have reached the adsorbent.

The desorption mode prediction means may predict the mode in which unburnt fuel components are desorbed, for example, using an amount of intake air in the internal combustion engine or an opening degree of a throttle valve disposed in an intake passage of the internal combustion engine as parameters.

The reason for employing this construction is as follows. If the amount of intake air in the internal combustion engine has abruptly increased, or if the opening degree of the throttle valve has abruptly changed towards the opening direction and caused an abrupt increase in amount of intake air in the internal combustion engine, the amount of exhaust gas discharged from the internal combustion engine increases in accordance with the increase in amount of intake air. Thus, the flow rate and pressure of the exhaust gas passing through the adsorbent increase, and the adsorbent rises in temperature abruptly to such an extent that the unburnt fuel components adsorbed by the adsorbent are desorbed easily.

Detailed Description of Preferred Embodiment

Hereinafter, a concrete embodiment of an exhaust gas purifier for an internal combustion engine in accordance with the present invention will be described with reference to the drawings.

Figure 1:
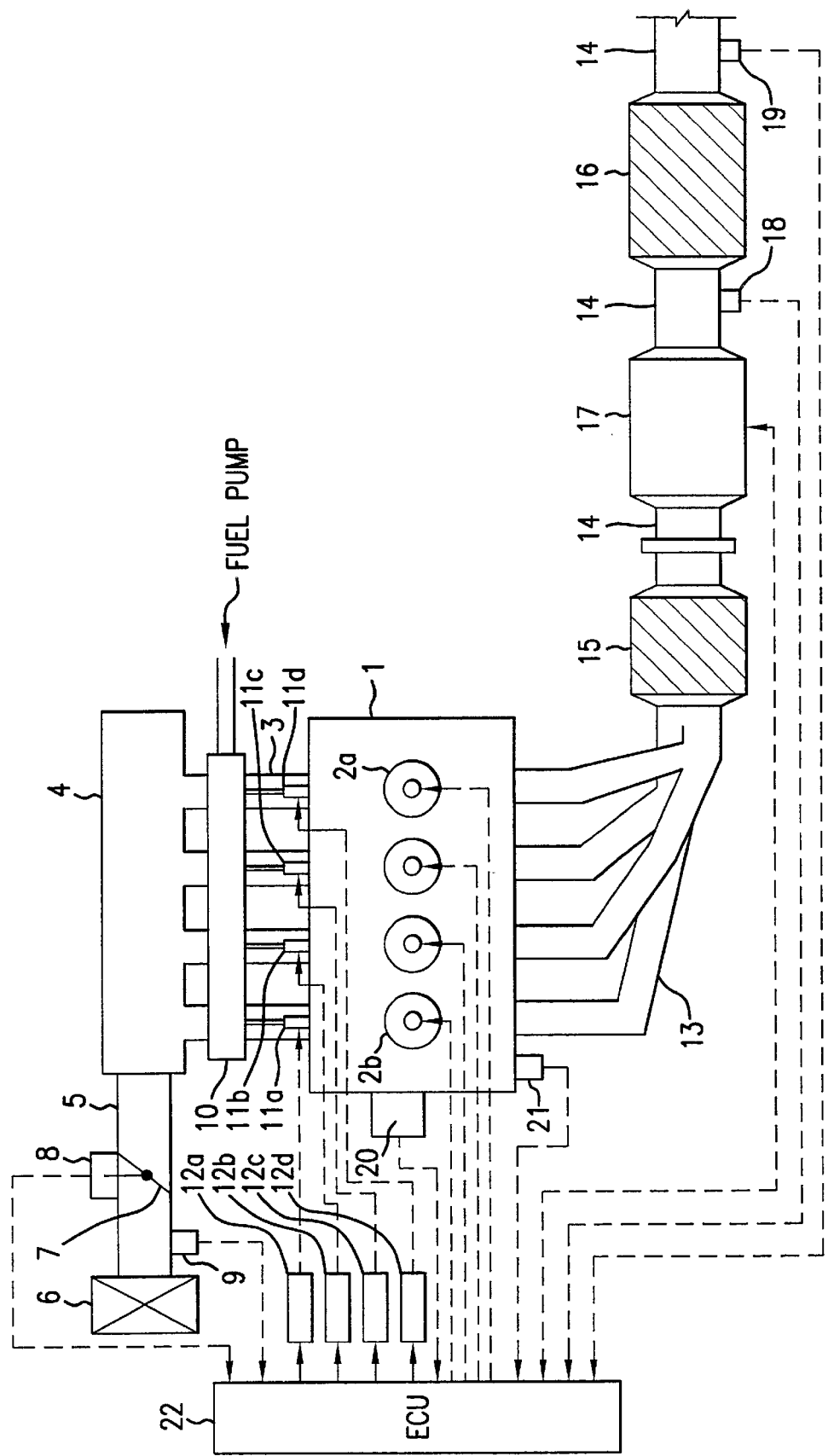
FIG. 1 schematically shows the structure of an internal combustion engine to which a catalyst deterioration detecting device in accordance with the present invention is applied.

FIG. 1 schematically shows the structure of the internal combustion engine to which the exhaust gas purifier in accordance with the present invention is applied.

An internal combustion engine 1 shown in FIG. 1 is a four-cycle water-cooled gasoline engine having four cylinders 2a. This internal combustion engine 1 is fitted with ignition plugs 2b facing combustion chambers of the respective cylinders 2a.

An intake manifold 3 is connected to the internal combustion engine 1. Branch pipes of the intake manifold 3 communicate with the combustion chambers of the respective cylinders 2a via intake ports (not shown).

The intake manifold 3 is connected to a surge tank 4, which is connected to an air cleaner box 6 via an intake pipe 5.

The intake pipe 5 is provided with a throttle valve 7 which is interlocked with an accelerator pedal (not shown) and adjusts an amount of intake air flowing inside the intake pipe 5. The throttle valve 7 is fitted with a throttle position sensor 8 which outputs an electric signal corresponding to an opening degree of the throttle valve 7.

In a section upstream of the throttle valve 7, the intake pipe 5 is fitted with an airflow meter 9 which outputs an electric signal corresponding to a mass of intake air flowing inside the intake pipe 5.

The branch pipes of the intake manifold 3 are fitted with fuel injection valves 11a, 11b, 11c, 11d (hereinafter generically referred to as fuel injection valves 11) respectively, which inject fuel towards the intake ports of the respective cylinders 2a.

The respective fuel injection valves 11 communicate with a fuel distributing pipe 10, which communicates with a fuel pump (not shown). The fuel discharged from the fuel pump is supplied to the fuel distributing pipe 10 and then distributed therefrom to the respective fuel injection valves 11.

The respective fuel injection valves 11 are connected to drive circuits 12a, 12b, 12c and 12d (hereinafter generically referred to as drive circuits 12) via electric wires. Upon application of a drive current to the fuel injection valves 11 from the drive circuits 12, the fuel injection valves 11 are opened to inject fuel.

Meanwhile an exhaust manifold 13 is connected to the internal combustion engine 1. Branch pipes of the exhaust manifold 13 communicate with the combustion chambers of the respective cylinders 2a via exhaust ports (not shown). The exhaust manifold 13 is connected to an exhaust pipe 14, which is connected downstream thereof to a muffler (not shown).

An upstream-side three-way catalyst 15, which is designed as exhaust gas purification means in accordance with the present invention, is provided in a section of the exhaust manifold 13 where all the branch pipes gather. A downstream-side three-way catalyst 16, which is designed as an exhaust gas purification catalyst, is provided in the midst of the exhaust pipe 14.

The upstream-side three-way catalyst 15 and the downstream-side three-way catalyst 16 are composed of a ceramic carrier made of cordierite and formed like a grid with a plurality of through holes extending along the direction of flow of exhaust gas, and of a catalytic layer with which the surface of the ceramic carrier is coated. The catalytic layer is formed, for example, by having a noble metal catalytic substance of platinum-rhodium (Pt—Rh) type or palladium-rhodium (Pd—Rh) type carried on the surface of porous alumina ($Al_2O_3$) having a multitude of pores.

The upstream-side three-way catalyst 15 and downstream-side three-way catalyst 16 thus constructed are activated at a temperature equal to or higher than a predetermined temperature. If the air-fuel ratio of the exhaust gas flowing into the upstream-side three-way catalyst 15 and the downstream-side three-way catalyst 16 is in the vicinity of a desired air-fuel ratio, the catalysts 15, 16 cause the hydrocarbon (HC) and carbon monoxide (CO) in exhaust gas to react with the oxygen ($O_2$) in exhaust gas to be oxidized into $H_2O$ and $CO_2$, and at the same time, cause the NOx in exhaust gas to react with the HC and CO in exhaust gas to be reduced into $H_2O$, $CO_2$ and $N_2$.

Upstream of the downstream-side three-way catalyst 16, the exhaust pipe 14 is fitted with a first air-fuel ratio sensor 18 which outputs an electric signal corresponding to an air-fuel ratio of the exhaust gas flowing inside the exhaust pipe 14 (the exhaust gas flowing into the downstream-side three-way catalyst 16).

Downstream of the downstream-side three-way catalyst 16, the exhaust pipe 14 is fitted with a second air-fuel ratio sensor 19 which outputs an electric signal corresponding to an air-fuel ratio of the exhaust gas flowing inside the exhaust pipe 14 (the exhaust gas that has flown out of the downstream-side three-way catalyst 16).

The first and second air-fuel ratio sensors 18, 19 are formed, for example, of a solid electrolyte portion made of cylindrically calcined zirconia ($ZrO_2$), an outer platinum electrode covering an outer surface of the solid electrolyte portion, and an inner platinum electrode covering an inner surface of the solid electrolyte portion. If a voltage is applied between the electrodes, the sensors 18, 19 output a voltage proportional to a concentration of the oxygen in exhaust gas (a concentration of unburnt fuel components when the air-fuel ratio is richer than the stoichiometric air-fuel ratio) in accordance with movements of oxygen ions.

Figure 2:
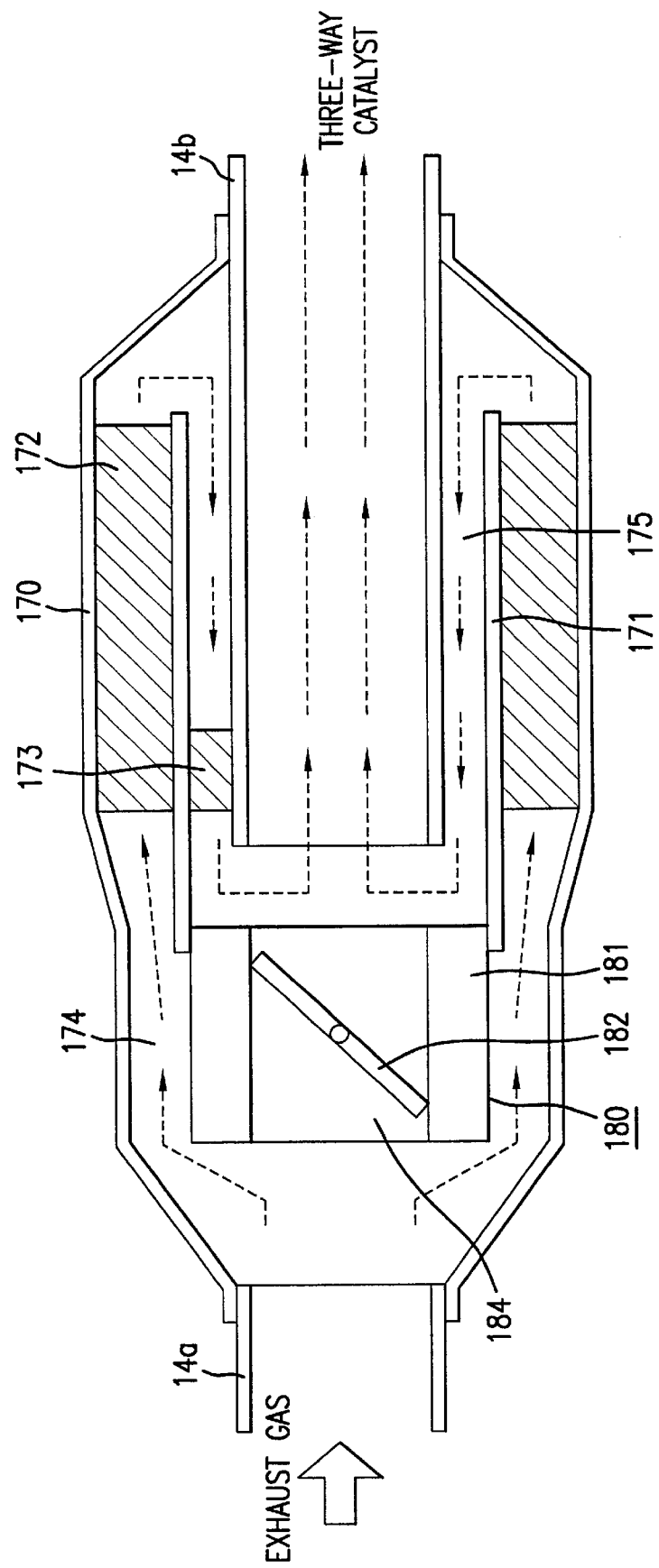
FIG. 2 is a drawing (1) showing the internal structure of an adsorption mechanism.

In a section upstream of the first air-fuel ratio sensor 18, the exhaust pipe 14 is provided with an adsorption mechanism 17. As shown in FIG. 2, this adsorption mechanism 17 includes an outer cylinder 170 having an inner diameter larger than an outer diameter of the exhaust pipe 14 and an intermediate cylinder 171 having an inner diameter larger than the outer diameter of the exhaust pipe 14 and an outer diameter smaller than the inner diameter of the outer cylinder 170.

An HC adsorbent 172, which is designed as an adsorbent in accordance with the present invention, is disposed in an annular space portion 174 formed between the intermediate cylinder 171 and the outer cylinder 170.

In the outer cylinder 170, the exhaust pipe 14 is separated into an upstream-side exhaust pipe 14a and a downstream-side exhaust pipe 14b. The upstream-side exhaust pipe 14a and the downstream-side exhaust pipe 14b are connected to each other via the outer cylinder 170. The downstream-side exhaust pipe 14b is held in the outer cylinder 170 so that an upstream-side open end of the pipe 14b protrudes into the outer cylinder 170 and that a leading end of the pipe 14b is not fixed. Correspondingly, the intermediate cylinder 171 is held in the outer cylinder 170 as follows. The intermediate cylinder 171 is fixed at one end to one of the outer cylinder 170, the exhaust pipe 14 and a later-described valve gear 180, and at the other end to none of the outer cylinder 170, the exhaust pipe 14 and the valve gear 180. Also, an upstream-side end of the intermediate cylinder 171 extends further upstream of an upstream-side end of the downstream-side exhaust pipe 14b.

The reason for employing this construction is as follows. The outer cylinder 170 tends to become lower in temperature than the intermediate cylinder 171 or the downstream-side exhaust pipe 14b. Therefore, in addition to the construction wherein the outer cylinder 170 is fixed to the upstream-side exhaust pipe 14a and the downstream-side exhaust pipe 14b, if both ends of the intermediate cylinder 171 or the upstream-side end of the downstream-side exhaust pipe 14b are (is) fixed to the outer cylinder 170 directly or indirectly via the valve gear 180, the adsorption mechanism 17 might break due to a difference in thermal expansion among the outer cylinder 170, the intermediate cylinder-171 and the downstream-side exhaust pipe 14b, to such an extent as to cause a reduction in durability.

The HC adsorbent 172 is fixed to only one of the outer cylinder 170 and the intermediate cylinder 171, whereby it becomes possible to permit a difference in thermal expansion between the outer cylinder 170 and the intermediate cylinder 171 resulting from a difference in temperature therebetween.

The HC adsorbent 172 is made, for example, of a material mainly containing zeolite. If the HC adsorbent 172 is at a temperature lower than a predetermined temperature range, it adsorbs the unburnt fuel components (unburnt HC) in exhaust gas. If the HC adsorbent 172 has been heated and reached a temperature within the predetermined temperature range, it discharges the adsorbed unburnt HC.

Holding members 173 are disposed at a plurality of locations in an annular space portion 175 between the intermediate cylinder 171 and the downstream-side exhaust pipe 14b to enhance vibration resistance of the downstream-side exhaust pipe 14b.

The holding members 173 are fixed to only one of an inner wall of the intermediate cylinder 171 and an outer wall of the downstream-side exhaust pipe 14b, so that the intermediate cylinder 171 and the downstream-side exhaust pipe 14b are not fixed to each other. Thus it is possible to absorb a difference in axial thermal expansion between the downstream-side exhaust pipe 14b and the intermediate cylinder 171.

If the holding members 173 have a certain shape or are made of a certain substance, they may be fixed to both the inner wall of the intermediate cylinder 171 and the outer wall of the downstream-side exhaust pipe 14b.

Figure 3:
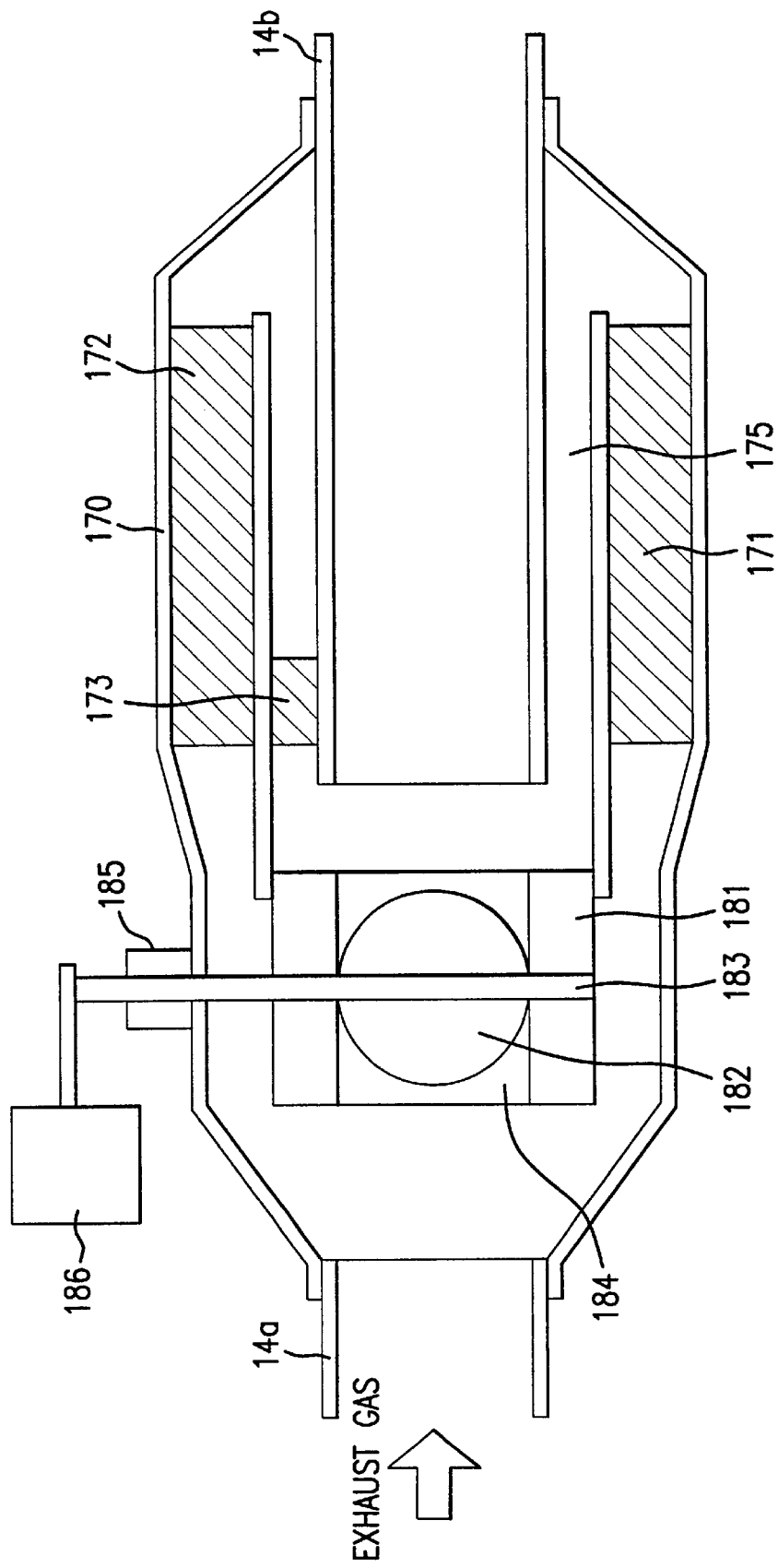
FIG. 3 is a drawing (2) showing the internal structure of an adsorption mechanism.

The valve gear 180, which opens and closes an upstream-side opening end of the intermediate cylinder 171, is provided at the opening end. As shown in FIG. 3, the valve gear 180 is constructed of a two-way valve of butterfly type.

To be more specific, the valve gear 180 includes a housing 181 fitted into the upstream-side opening end of the intermediate cylinder 171, a passage 184 axially penetrating the housing 181, a valve body 182 for opening and closing the passage 184, and a shaft 183 integrally fixed to the valve body 182.

The shaft 183 is rotatably supported at one end by the housing 181 and at the other end by a bearing 185 on an outer wall of the outer cylinder 170.

The shaft 183 is coupled at the other end to an actuator 186 via a link mechanism or the like. The actuator 186 is constructed of a stepper motor or the like, and rotationally drives the shaft 183 in accordance with a current applied.

The shaft 183 and the valve body 182 are integrally fixed to each other. Therefore, if the actuator 186 rotationally drives the shaft 183, the valve body 182 is opened and closed accordingly.

In the adsorption mechanism 17 thus constructed, when the upstream-side three-way catalyst 15 and the downstream-side three-way catalyst 16 are not activated, the actuator 186 is controlled so that the valve body 182 of the valve gear 180 is closed completely, as shown in FIG. 2.

In this case, since an exhaust gas flow passage (a main exhaust passage) extending from the upstream-side exhaust pipe 14a through the passage 184 to the downstream-side exhaust pipe 14b becomes impassable, the entire exhaust gas that has flown into the adsorption mechanism 17 from the upstream-side exhaust pipe 14a is introduced into the annular space portion 174 formed between the intermediate cylinder 171 and the outer cylinder 170.

After having passed through the HC adsorbent 172, the exhaust gas introduced into the space portion 174 hits the inner wall of the outer cylinder 170, changes its direction of flow, and is then introduced into the annular space portion 175 formed between the intermediate cylinder 171 and the downstream-side exhaust pipe 14b.

The exhaust gas introduced into the space portion 175 flows through the space portion 175 from the downstream side towards the upstream side of the adsorption mechanism 17. The exhaust gas that has passed through the space portion 175 hits the valve gear 180, changes its direction of flow again, and then flows into the downstream-side exhaust pipe 14b.

Hereinafter, the aforementioned flow passage (the exhaust gas flow passage extending from the upstream-side exhaust pipe 14a through the space portions 174, 175 to the downstream-side exhaust pipe 14b) will be referred to as a bypass passage.

If the valve body 182 of the valve gear 180 is thus closed completely, the entire exhaust gas that has flown into the adsorption mechanism 17 flows through the bypass passage, so that the unburnt HC contained in the exhaust gas is adsorbed by the HC adsorbent 172 in the bypass passage.

Figure 4:
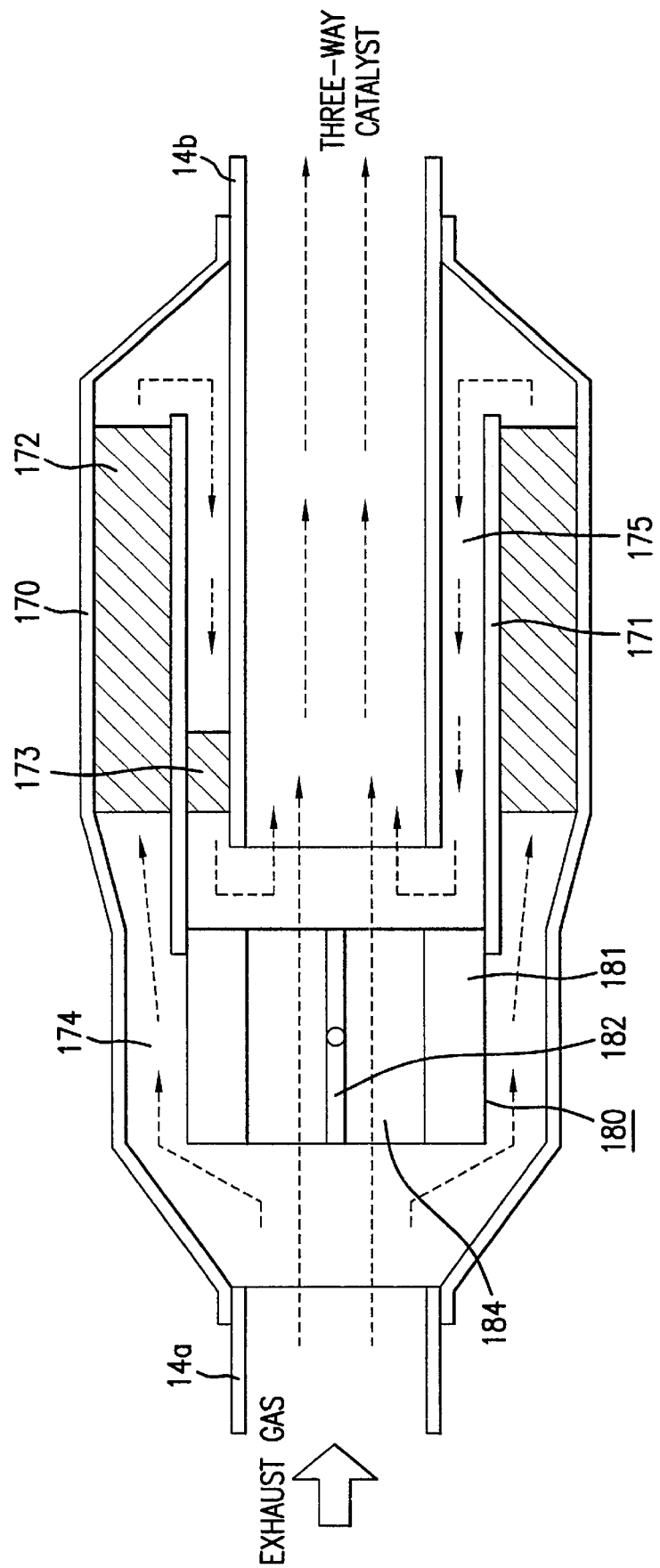
FIG. 4 illustrates the operation of the adsorption mechanism.

In the adsorption mechanism 17, after the downstream-side three-way catalyst 16 has been activated, the actuator 186 is controlled so that the valve body 182 of the valve gear 180 is opened completely, as shown in FIG. 4.

In this case, in the adsorption mechanism 17, the main exhaust passage extending from the upstream-side exhaust pipe 14a through the passage 184 to the downstream-side exhaust pipe 14b becomes passable, and the bypass passage extending from the upstream-side exhaust pipe 14a through the space portions 174, 175 to the downstream-side exhaust pipe 14b also becomes passable.

Because the adsorption mechanism 17 shown in this embodiment is designed so that the bypass passage exhibits a greater exhaust gas resistance than the main exhaust passage, most of the exhaust gas that has flown into the adsorption mechanism 17 from the upstream-side exhaust pipe 14a flows through the main exhaust passage, and the rest of the exhaust gas flows through the bypass passage.

The exhaust gas that has flown through the main exhaust passage flows into the downstream-side three-way catalyst 16, so that the hydrocarbon (HC), carbon monoxide (CO) and nitrogen oxides (NOx) in the exhaust gas are purified in the downstream-side three-way catalyst 16.

On the other hand, the exhaust gas flowing through the bypass passage flows into the downstream-side three-way catalyst 16 after having passed through the HC adsorbent 172. When exhaust gas passes through the HC adsorbent 172, the heat latent in the exhaust gas is transmitted to the HC adsorbent 172, so that the HC adsorbent 172 rises in temperature. If the HC adsorbent 172 reaches a temperature within a predetermined temperature range, the unburnt HC adsorbed by the HC adsorbent 172 is desorbed therefrom. The unburnt HC desorbed from the HC adsorbent 172 flows into the downstream-side three-way catalyst 16 together with the exhaust gas flowing through the bypass passage and is purified in the downstream-side three-way catalyst 16.

Referring back to FIG. 1, the internal combustion engine 1 is fitted with a crank position sensor 20, which is composed of a timing rotor mounted to an end of a crank shaft (not shown) and an electromagnetic pickup mounted to a cylinder block of the internal combustion engine 1. The crank position sensor 20 outputs a pulse signal every time the crank shaft rotates by a predetermined angle (e.g. 30°).

The internal combustion engine 1 is fitted with a coolant temperature sensor 21 which outputs an electric signal corresponding to a temperature of the coolant flowing inside a water jacket formed in the cylinder block and the cylinder head of the internal combustion engine 1.

The internal combustion engine 1 constructed as described above is accompanied by an electronic control unit (ECU) 22 for controlling the internal combustion engine 1. Various sensors including the throttle position sensor 8, the airflow meter 9, the first air-fuel ratio sensor 18, the second air-fuel ratio sensor 19, the crank position sensor 20 and the coolant temperature sensor 21 are connected to the ECU 22 via electric wires. Output signals from the respective sensors are inputted to the ECU 22.

The ignition plugs 2b, the drive circuits 12, the actuator 186 of the valve gear 180 and the like are connected to the ECU 22 via electric wires, so that the ECU 22 can perform various control operations including ignition control, fuel injection control, and on-off control of the valve gear 180.

Figure 5:
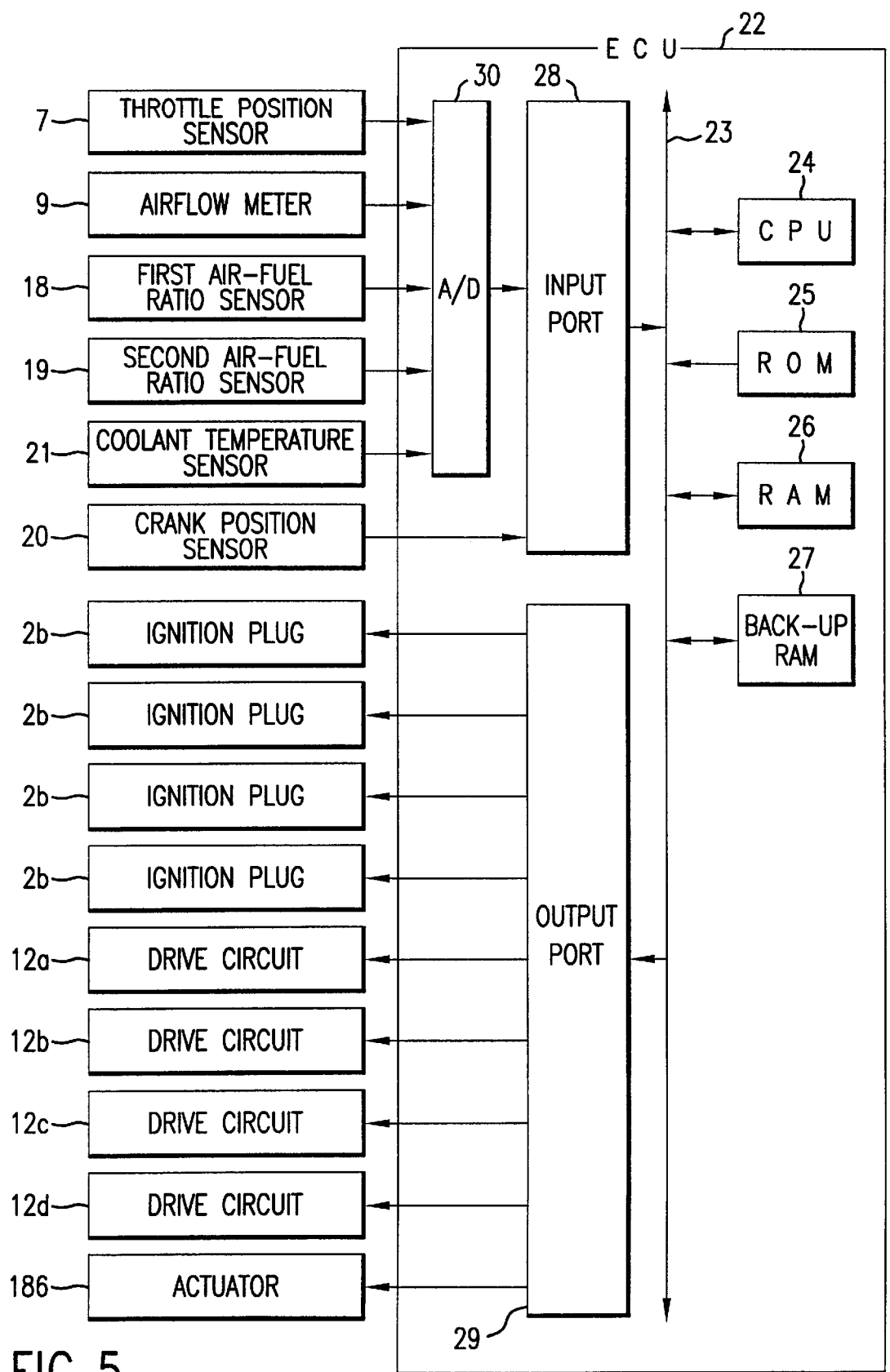
FIG. 5 is a block diagram showing the internal structure of an ECU.

As shown in FIG. 5, the ECU 22 includes a CPU 24, a ROM 25, a RAM 26, a back-up RAM 27, an input port 28 and an output port 29, which are interconnected to one another by a bi-directional bus 23. The ECU 22 also includes an A/D converter (A/D) 30 connected to the input port 28.

Output signals from sensors outputting digital signals, such as the crank position sensor 20, are inputted to the input port 28 and then sent to the CPU 24 and the RAM 26.

Output signals from sensors outputting analog signals, such as the throttle position sensor 7, the airflow meter 9, the first air-fuel ratio sensor 18, the second air-fuel ratio sensor 19 and the coolant temperature sensor 21, are inputted to the input port 28 via the A/D converter 30 and then sent to the CPU 24 and the RAM 26.

The output port 29 is connected to the ignition plugs 2b, the drive circuits 12 and the actuator 186 of the valve gear 180 via electric wires. Control signals outputted from the CPU 24 are sent to the ignition plugs 2b, the drive circuits 12 and the actuator 186 through the output port 29.

The ROM 25 stores various control maps and application programs such as an ignition timing control routine for determining ignition timings of the respective ignition plugs 2b, a fuel injection amount control routine for determining amounts of fuel to be injected from the respective fuel injection valves 11, an air-fuel ratio feedback control routine for performing air-fuel ratio feedback control of fuel injection amounts, a fuel injection timing control routine for determining fuel injection timings of the respective fuel injection valves 11, and an adsorption mechanism control routine for on-off controlling the valve gear 180 of the adsorption mechanism 17.

The control maps include, for example, an ignition timing control map indicative of a relation between operating states of the internal combustion engine 1 and ignition timings, a fuel injection amount control map indicative of a relation between operating states of the internal combustion engine 1 and fuel injection amounts, and a fuel injection timing control maps indicative of a relation between operating states of the internal combustion engine 1 and fuel injection timings.

The RAM 26 stores output signals from the respective sensors, calculation results obtained from the CPU 24, and the like. The calculation results include, for example, an engine speed which is calculated based on time intervals at which the crank position sensor 20 outputs a pulse signal. Every time the crank position sensor 20 outputs a signal, the data stored in the RAM 26 are rewritten into the latest data.

The back-up RAM 27 is a non-volatile memory which is capable of storing data even after the operation of the internal combustion engine 1 has been stopped.

The CPU 24 operates according to the application programs stored in the ROM 25, determines an operating state of the internal combustion engine 1 based on the output signals from the respective sensors stored in the RAM 26, and determines ignition timings, fuel injection amounts, fuel injection timings, on-off timings of the valve gear 180 and the like based on the operating state of the internal combustion engine 1 and the respective control maps. In accordance with the determined ignition timings, fuel injection amounts, fuel injection timings and on-off timings of the valve gear 180, the CPU 24 controls the ignition plugs 2b, the drive circuits 12 and the actuator 186.

For example, the CPU 24 operates according to the fuel injection amount control routine when performing the fuel injection control, and determines a fuel injection amount (fuel injection period) TAU according to a fuel injection amount calculation formula as shown below.

$$TAU=TP*FWL*(FAF+FG)*[FASE+FAE+FOTP+FDE(D)]*FFC+TAUV$$

(TP: basic injection amount, FWL: warm-up increase amount, FAF: air-fuel ratio feedback correction factor, FG: air-fuel ratio learning factor, FASE: post-starting increase amount, FAE: acceleration increase amount, FOTP: OTP increase amount, FDE(D): deceleration increase amount (decrease amount), FFC: fuel-cut recovery correction factor, TAUV: invalid injection period)

The CPU 24 judges an operating state of the internal combustion engine using output signal values of the various sensors, and calculates the aforementioned basic injection amount TP, warm-up increase amount FWL, post-starting increase amount FASE, acceleration increase amount FAE, OTP increase amount FTOP, deceleration increase amount FDE (D), fuel-cut recovery correction factor FFC, invalid injection period TAUV and the like based on the judged operating state of the engine and the fuel injection amount control map in the ROM 25.

The CPU 24 calculates an air-fuel ratio feedback correction factor (FAF) according to the following procedure. That is, the CPU judges first of all whether or not an air-fuel ratio feedback control condition is established.

For example, the air-fuel ratio feedback control condition may be a condition that the coolant temperature is equal to or higher than a predetermined temperature, that the internal combustion engine 1 is not being started, that the correction of a post-starting increase amount of fuel injection is not being made, that the correction of a warm-up increase amount of fuel injection is not being made, that the correction of an acceleration increase amount of fuel injection is not being made, that the correction of an OTP increase amount for preventing heat-up of exhaust system components such as the upstream-side three-way catalyst 15 and the downstream-side three-way catalyst 16 is not being made, or that the fuel-cut control is not being performed.

If the aforementioned air-fuel ratio feedback control condition is not established, the CPU 24 sets the air-fuel ratio feedback correction factor (FAF) to "1.0" and calculates a fuel injection amount (TAU).

On the other hand, if the aforementioned air-fuel ratio feedback control condition is established, an output signal from the first air-fuel ratio sensor 18 is inputted to the CPU 24. Based on the inputted output signal and a response delay time of the first air-fuel ratio sensor 18, the CPU 24 judges whether the actual air-fuel ratio of exhaust gas (the exhaust gas flowing into the downstream-side three-way catalyst 16) is richer or leaner than the stoichiometric air-fuel ratio.

If the actual air-fuel ratio of exhaust gas is judged to be richer than the stoichiometric air-fuel ratio, the CPU 24 corrects the air-fuel ratio feedback correction factor (FAF) to decreasingly correct the fuel injection amount (TAU). If the actual air-fuel ratio of exhaust gas is judged to be leaner than the stoichiometric air-fuel ratio, the CPU 24 corrects the air-fuel ratio feedback correction factor (FAF) to increasingly correct the fuel injection amount (TAU).

The CPU 24 performs upper and lower limit guard processings for the air-fuel ratio feedback correction factor (FAF) calculated according to the aforementioned procedure. By assigning the air-fuel ratio feedback correction factor (FAF) that has undergone the guard processings to the fuel injection amount calculation formula, the CPU 24 calculates the fuel injection amount (TAU).

Through the performance of the air-fuel ratio feedback control as mentioned above, the air-fuel ratio of the exhaust gas flowing into the downstream-side three-way catalyst 16 becomes an air-fuel ratio suited for the purification of exhaust gas by the downstream-side three-way catalyst 16.

In parallel with the aforementioned air-fuel ratio feedback control (first air-fuel ratio feedback control) based on an output signal from the first air-fuel ratio sensor 18, the CPU 24 may perform the air-fuel ratio feedback control (second air-fuel ratio feedback control) based on an output signal from the second air-fuel ratio sensor 19.

For example, during the second air-fuel ratio feedback control, the CPU 24 compares an output signal value of the second air-fuel ratio sensor 19 with a predetermined reference voltage, and judges whether the air-fuel ratio of the exhaust gas that has flown out of the downstream-side three-way catalyst 16 is rich or lean. Based on the result of judgement, the CPU 24 corrects a reference value for judging richness/leanness in the first air-fuel ratio feedback control, a correction amount of the feedback correction factor (FAF) and the like, and inhibits, for example, deterioration of exhaust emission property resulting from the inconsistency in output characteristics among individual products of the first air-fuel ratio sensor 18 or the time-dependent change in output characteristic of the first air-fuel ratio sensor 18.

Figure 6:
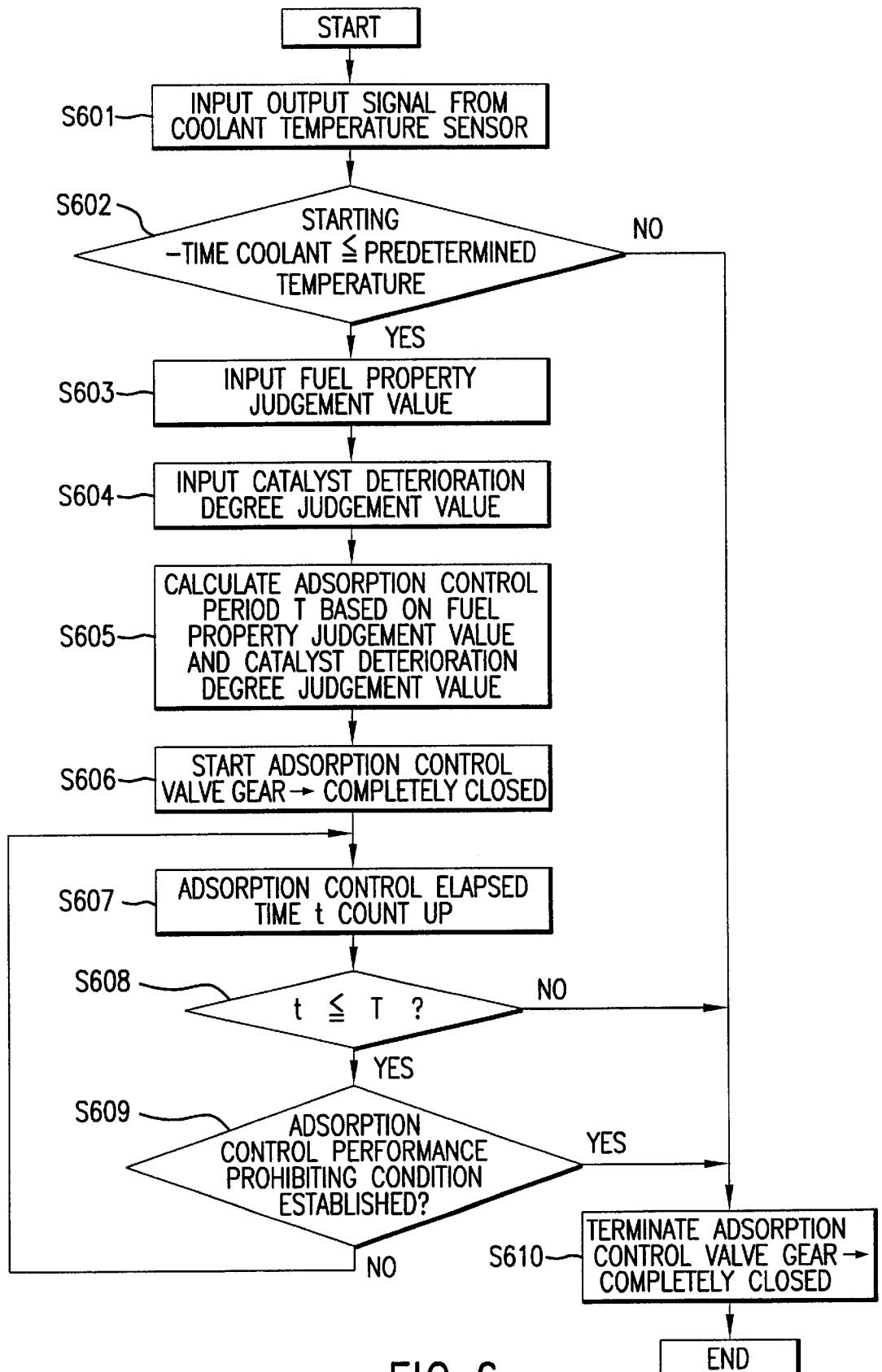
FIG. 6 is a flowchart showing an adsorption mechanism control routine.

Next, the CPU 24 performs the adsorption mechanism control routine as shown in FIG. 6 to control the valve gear 180 of the adsorption mechanism 17. The adsorption mechanism control routine is executed when the internal combustion engine 1 is started. For example, this routine is executed using an on-signal of a starter switch as a trigger.

In the adsorption mechanism control routine, first of all in S601, an output signal from the coolant temperature sensor 21 (starting-time coolant temperature) is inputted to the CPU 24.

Using the starting-time coolant temperature inputted in S601 as a parameter, the CPU 24 judges in S602 whether or not the upstream-side three-way catalyst 15 and the downstream-side three-way catalyst 16 are inactive. To be more specific, the CPU 24 judges whether or not the starting-time coolant temperature is equal to or lower than a predetermined temperature.

If the starting-time coolant temperature is judged to be higher than the predetermined temperature in S602, the CPU 24 judges that the upstream-side three-way catalyst 15 and the downstream-side three-way catalyst 16 are activated, and then proceeds to S610.

In S610, the CPU 24 controls the actuator 186 of the valve gear 180 to make the main exhaust passage in the adsorption mechanism 17 passable (to completely open the valve body 182 of the valve gear 180).

In this case, in the adsorption mechanism 17, both the main exhaust passage and the bypass passage become passable. That is, most of the exhaust gas coming from the internal combustion engine 1 flows into the second three-way catalyst 16 through the main exhaust passage, and a negligible amount of exhaust gas flows into the second three-way catalyst 16 through the bypass passage.

The hydrocarbon (HC), carbon monoxide (CO) and nitrogen oxides (NOx) contained in the exhaust gas that has flown into the second three-way catalyst 16 through the main exhaust passage and the bypass passage are purified by the second three-way catalyst 16 which has been activated.

On the other hand, if the starting-time coolant temperature is judged to be equal to or lower than the predetermined temperature, the CPU 24 judges that the upstream-side three-way catalyst 15 and the downstream-side three-way catalyst 16 are inactive and that the unburnt HC contained in the exhaust gas discharged from the internal combustion engine 1 needs to be adsorbed by the adsorbent 172 in the adsorption mechanism 17, and then proceeds to S603.

In S603, the CPU 24 reads out from the back-up RAM 27 a fuel property judgement value that has been judged in a separate fuel property judging routine.

For example, as a method of judging a property of fuel, the judgement is made based on the magnitude of fluctuations of combustion in the internal combustion engine 1. This is based on the following knowledge. The heavier fuel becomes, the more difficult it becomes for the fuel to be atomized and gasified, and for the fuel and air to be mixed homogeneously with each other. Hence the combustion of the mixture is destabilized, which results in an increase in fluctuations of combustion.

After having performed the processing in S603, the CPU 24 proceeds to S604 and reads out from the back-up RAM 27 a catalyst deterioration degree judgement value that has been judged in a separate upstream-side three-way catalyst deterioration judging routine.

For example, as a method of judging a degree of deterioration of the upstream-side three-way catalyst 15, a degree of deterioration of oxygen storage capacity (OSC) of the three-way catalyst is judged, and the degree of deterioration of the three-way catalyst is estimated from the degree of deterioration of OSC.

After having performed the processing in S604, the CPU 24 proceeds to S605. Then the CPU 24 predicts a mode in which the unburnt HC discharged from the internal combustion engine 1 reaches the adsorbent 172, using the fuel property judgement value read out in S603 and the catalyst deterioration degree judgment value read out in S604 as parameters. Based on the predicted mode, the CPU 24 calculates a period T for controlling the adsorption mechanism 17 so that the adsorbent 172 adsorbs the unburnt HC (i.e. a period for keeping the valve gear 180 completely closed to cause the entire exhaust gas to flow through the bypass passage, which will hereinafter be referred to as an adsorption control period T). If the upstream-side three-way catalyst 15 is at a low temperature, the unburnt HC in exhaust gas is physically adsorbed by the upstream-side three-way catalyst 15. As the upstream-side three-way catalyst 15 rises in temperature, the unburnt HC adsorbed by the upstream-side three-way catalyst 15 is desorbed by being gasified and reaches the adsorbent 172. In this process, the mode in which the unburnt HC reaches the adsorbent 172 differs depending on the fuel property.

Figure 7:
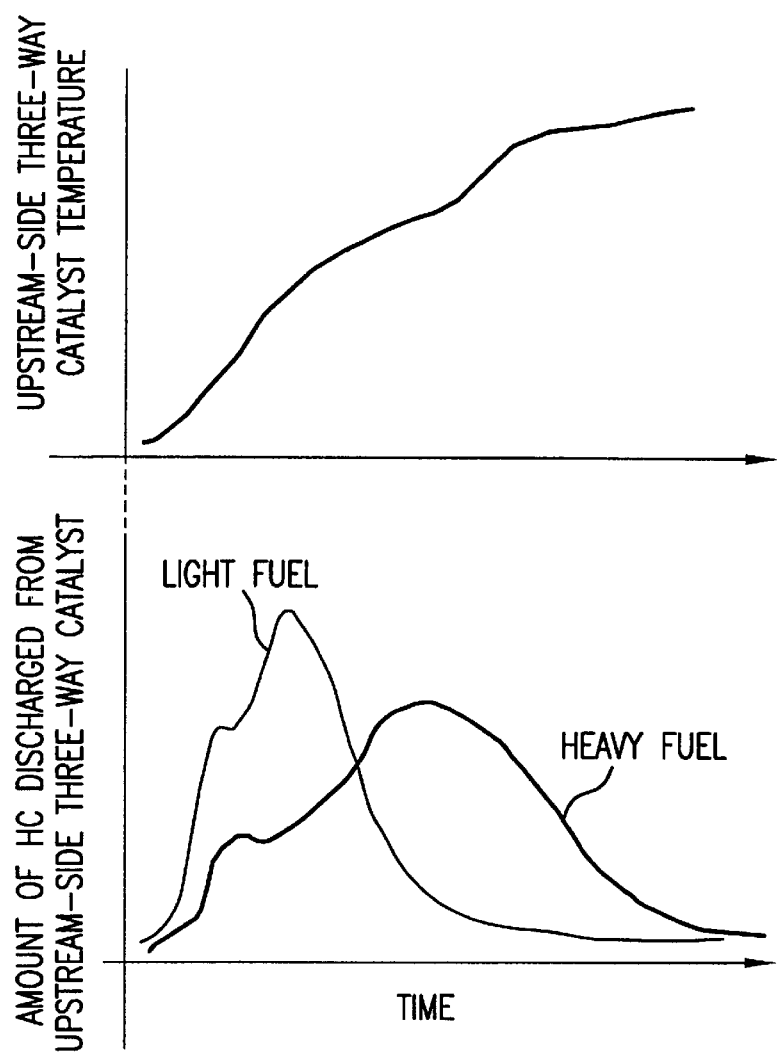
FIG. 7 illustrates a relation between fuel properties and characteristics of unburnt HC discharged from an upstream-side three-way catalyst.

Namely, if light fuel is used, unburnt HC is likely to be gasified and unlikely to adhere to the upstream-side three-way catalyst 15. Therefore, as shown in FIG. 7, the unburnt HC adsorbed by the upstream-side three-way catalyst 15 is desorbed at a relatively early timing after the starting of the internal combustion engine 1 when the upstream-side three-way catalyst 15 is at a relatively low temperature.

On the other hand, if heavy fuel is used, unburnt HC is unlikely to be gasified and likely to adhere to the upstream-side three-way catalyst 15. Therefore, as shown in FIG. 7, the unburnt HC adsorbed by the upstream-side three-way catalyst 15 is desorbed at a relatively late timing after the starting of the internal combustion engine 1 when the upstream-side three-way catalyst 15 is at a relatively high temperature.

As a result, the lighter the fuel becomes, the earlier the unburnt HC to be absorbed by the adsorbent 172 reaches the adsorbent 172. The heavier the fuel becomes, the later the unburnt HC reaches the adsorbent 172.

After the internal combustion engine 1 has been started, while the upstream-side three-way catalyst 15 is inactive, the unburnt HC in exhaust gas reaches the adsorbent 172 without being purified in the upstream-side three-way catalyst 15. If the upstream-side three-way catalyst 15 is activated afterwards, the unburnt HC in exhaust gas is purified in the upstream-side three-way catalyst 15. Therefore, the amount of the unburnt HC reaching the adsorbent 172 decreases. The mode in which the unburnt HC reaches the adsorbent 172 differs depending on a degree of deterioration of the upstream-side three-way catalyst 15, especially on a low-temperature activation ability of the upstream-side three-way catalyst 15.

Figure 8:
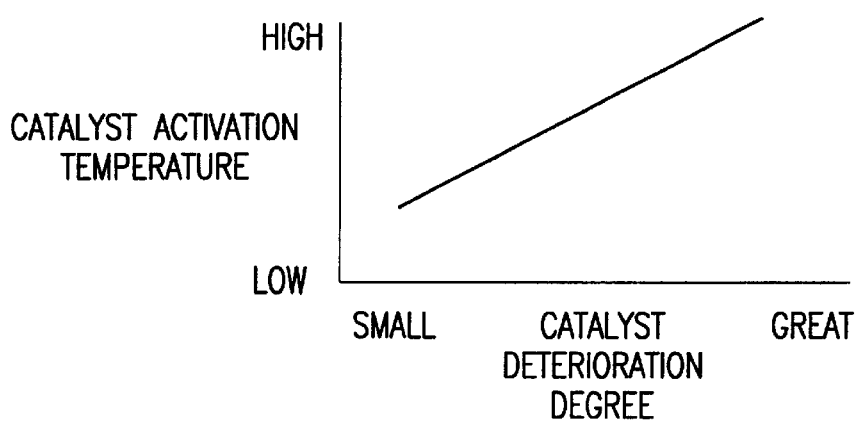
FIG. 8 illustrates a relation between a degree of deterioration of the upstream-side three-way catalyst and an activation temperature.
Figure 9:
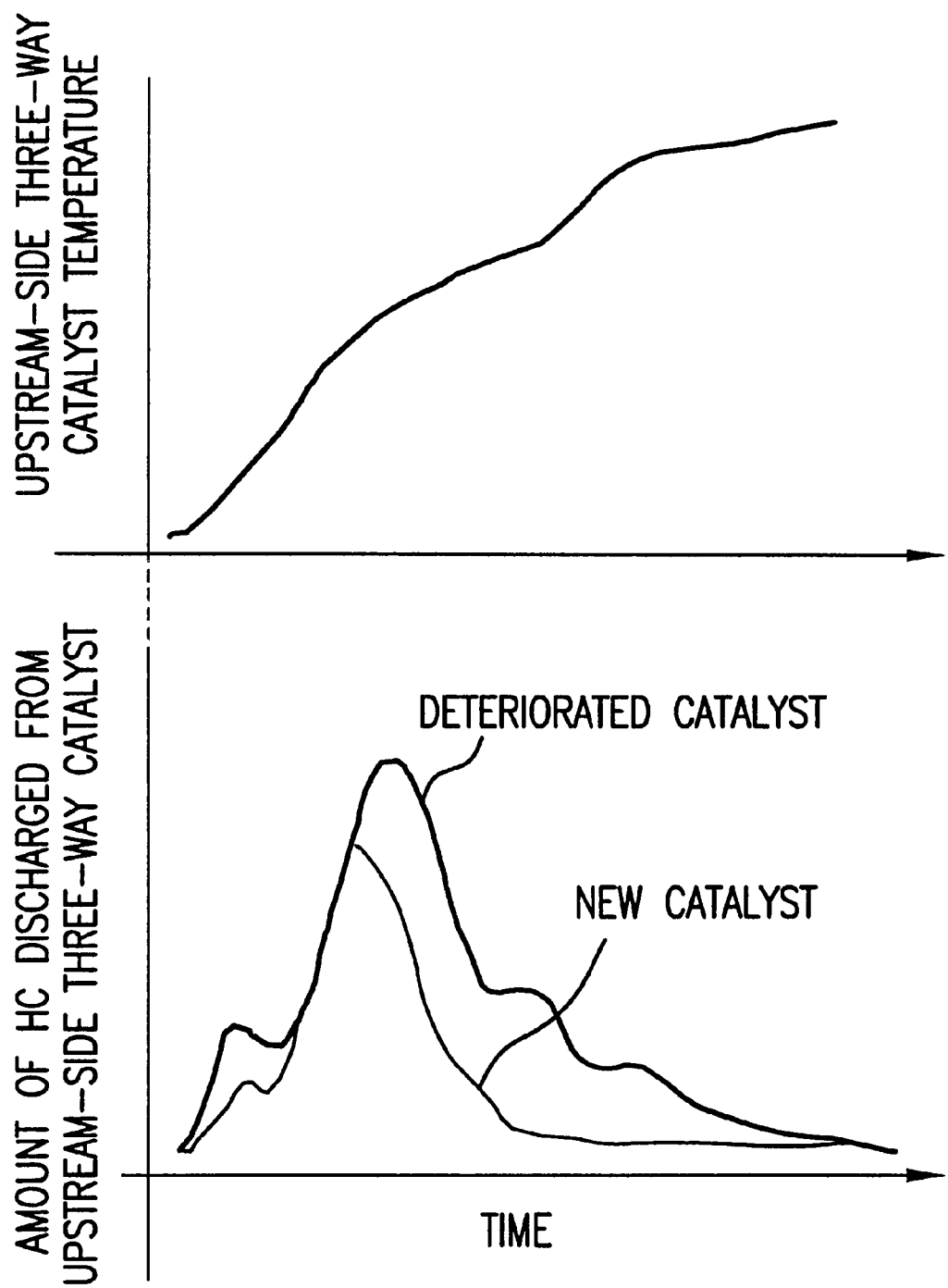
FIG. 9 illustrates a relation between a degree of deterioration of the upstream-side three-way catalyst and a characteristic of unburnt HC discharged from the upstream-side three-way catalyst.

Namely, as shown in FIG. 8, the greater the degree of deterioration of low-temperature activation ability of the upstream-side three-way catalyst 15 becomes, the higher the activation temperature of the upstream-side three-way catalyst 15 becomes. Hence, if the degree of deterioration of low-temperature activation ability is small, the upstream-side three-way catalyst 15 is activated at a relatively early timing after the starting of the internal combustion engine 1 (when the upstream-side three-way catalyst 15 is at a relatively low temperature), as shown in FIG. 9. Thus, the amount of the unburnt HC reaching the adsorbent 172 decreases at a relatively early timing after the starting of the engine.

On the other hand, if the degree of deterioration of low-temperature activation ability of the upstream-side three-way catalyst 15 is great, the upstream-side three-way catalyst 15 is activated at a relatively late timing after the starting of the internal combustion engine 1 (when the upstream-side three-way catalyst 15 is at a relatively high temperature). Thus, the amount of the unburnt HC reaching the adsorbent 172 does not decrease until a relatively late timing after the starting of the engine.

As a result, the smaller the degree of deterioration of low-temperature activation ability of the upstream-side three-way catalyst 15, the faster the unburnt HC to be absorbed by the adsorbent 172 reaches the adsorbent 172. The greater the degree of deterioration of low temperature activation ability of the upstreamn-side three-way catalyst 15, the longer it takes the unburnt HC to reach the adsorbent 172.

Accordingly, as the degree of heaviness indicated by the fuel property judgement value becomes greater, and as the degree of deterioration of the catalyst becomes greater, the CPU 24 predicts in S605 that it takes longer for the unburnt HC to be adsorbed by the adsorbent 172 to reach the adsorbent 172. Hence the CPU 24 sets the adsorption control period T to a long period.

After having performed the processing in S605, the CPU 24 proceeds to S606 and starts adsorption control of the adsorption mechanism 17. That is, the CPU 24 starts controlling the actuator 186 to completely close the valve gear 180.

Then in S607, the CPU 24 counts up an elapsed time (adsorption control elapsed time) t since the starting of the adsorption control.

The CPU 24 judges in S608 whether or not the adsorption control elapsed time t is equal to or shorter than the adsorption control period T calculated in S605.

If the adsorption control elapsed time t is judged to be equal to or shorter than the adsorption control period T in S608, the CPU 24 proceeds to S609 and judges whether or not the condition for prohibiting the performance of adsorption control is established.

The adsorption control performance prohibiting condition is a condition which is predicted as soon as the unburnt HC adsorbed by the adsorbent 172 is desorbed therefrom. For example, the adsorption control performance prohibiting condition includes a condition that the coolant temperature is equal to or higher than a predetermined temperature, that the upstream-side three-way catalyst 15 or the downstream-side three-way catalyst 16 is at a temperature equal to or higher than a predetermined temperature, that the adsorbent 172 is at a temperature equal to or higher than a predetermined temperature, that the cumulative amount of intake air since the starting of the internal combustion engine 1 is equal to or greater than a predetermined amount, or that the amount of change of the throttle valve 7 is equal to or greater than a predetermined amount.

If the adsorption control prohibiting condition is judged to be established in S609, the CPU 24 proceeds to S610 and controls the actuator 186 to switch the valve gear 180 from its completely closed state to its completely open state. The CPU 24 finishes performing the adsorption control and thereby terminates the execution of the present routine.

On the other hand, if the adsorption control performance prohibiting condition is judged to be unestablished, the CPU 24 repeatedly performs the processings in S607 and the following steps until the adsorption control elapsed time t exceeds the adsorption control period T.

If the adsorption control elapsed time t exceeds the adsorption control period T, the CPU 24 judges in S608 that the adsorption control elapsed time t has exceeded the adsorption control period T. Then the CPU 24 proceeds to S610 and finishes performing the adsorption control.

The CPU 24 thus performs the adsorption mechanism control routine, whereby reaching mode prediction means and switching control means are realized.

Thus, the exhaust gas purifier in accordance with this embodiment controls the valve gear 180 based on the mode in which the unburnt HC to be adsorbed by the adsorbent 172 reaches the adsorbent 172 when the upstream-side three-way catalyst 15 and the downstream-side three-way catalyst 16 are inactive, for example, in the case where the internal combustion engine 1 has been cold-started. Therefore, there is no possibility that the adsorption control be terminated before the entire unburnt HC to be adsorbed by the adsorbent 172 reaches the adsorbent 172 or that the adsorption control be terminated with an undue delay after the entire unburnt HC to be adsorbed by the adsorbent 172 has reached the adsorbent 172. Consequently, there is no possibility that the unburnt HC to be adsorbed by the adsorbent 172 be discharged without being adsorbed by the adsorbent 172.

The description of this embodiment has been made citing an example in which the fuel property and the degree of deterioration of the upstream-side three-way catalyst 15 are used as parameters for predicting a mode in which the unburnt HC reaches the adsorbent 172. However, in addition to the fuel property and the degree of deterioration of the upstream-side three-way catalyst 15, the change in amount of intake air in the internal combustion engine 1 may be used as a parameter.

Figure 10A:
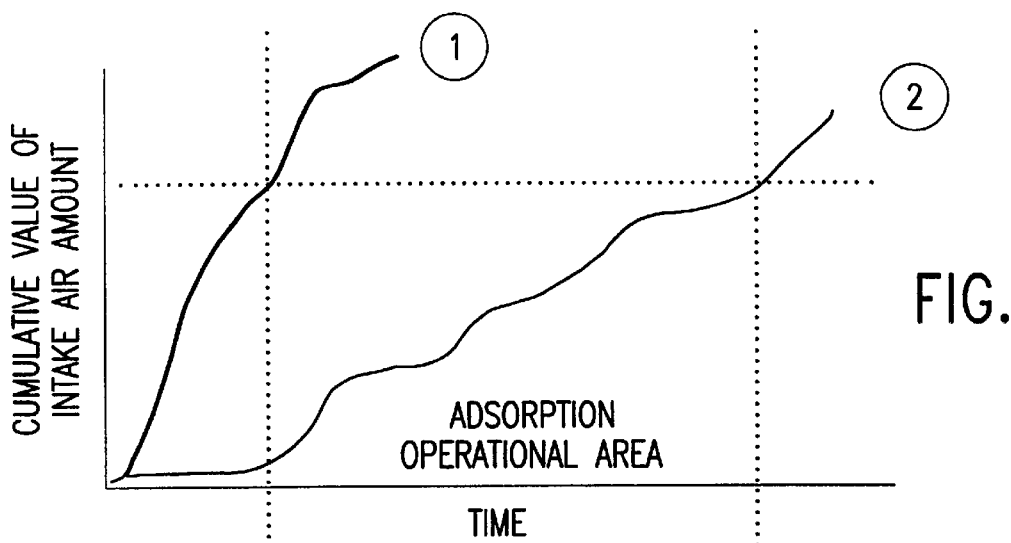
FIG. 10 illustrates a relation between changes in amount of intake air and characteristics of unburnt HC discharged from the upstream-side three-way catalyst, and a relation between changes in amount of intake air and characteristics of desorption of unburnt HC from an adsorbent.
Figure 10B:
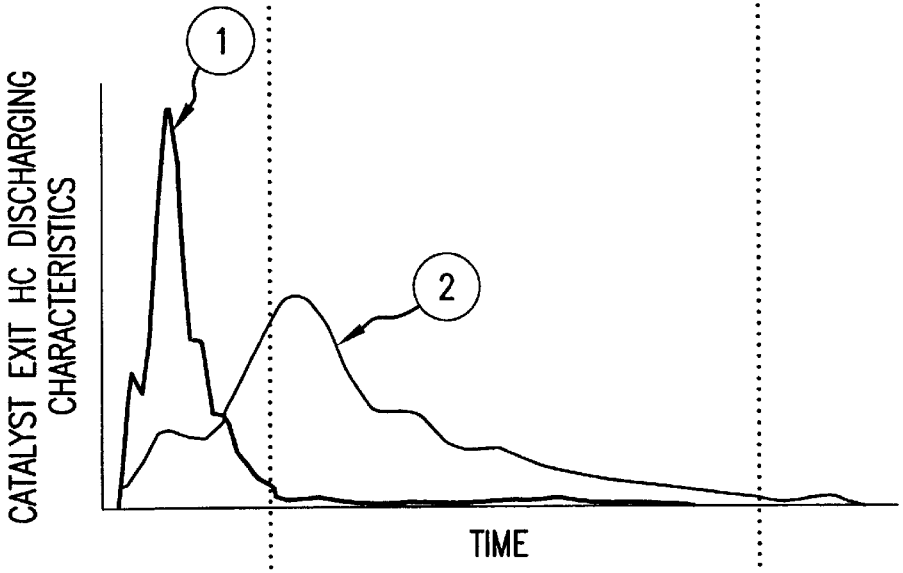
Figure 10C:
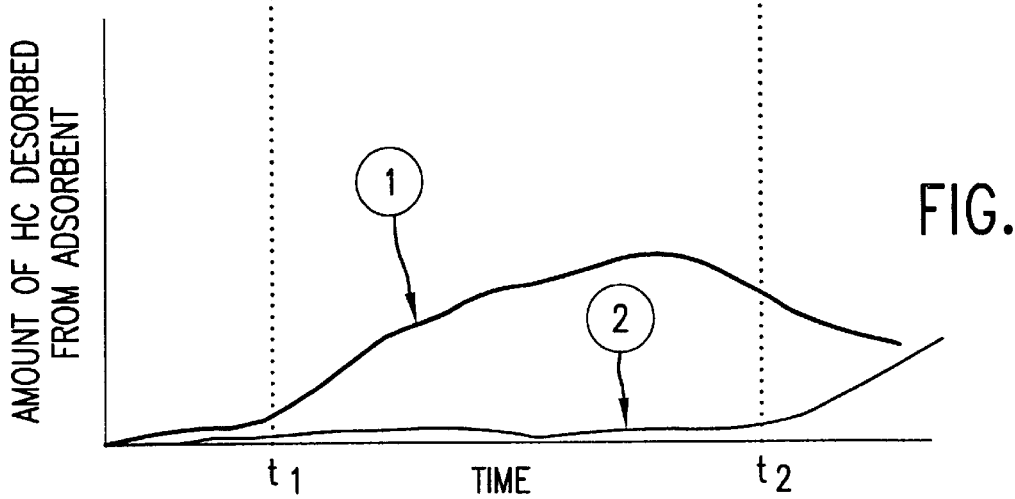

For example, if the amount of intake air has abruptly increased as shown in FIG. 10 (a) (see a graph (1) in FIG. 10 (a)), the flow rate and pressure of exhaust gas abruptly increase accordingly, and besides, the upstream-side three-way catalyst 15 rises in temperature quickly. -Therefore, the unburnt HC that has physically been adsorbed by the upstream-side three-way catalyst 15 is discharged from the upstream-side three-way catalyst 15 in a short period of time and reaches the adsorbent 172 (see a graph (1) in FIG. 10 (b)). In accordance therewith, the unburnt HC adsorbed by the adsorbent 172 starts being desorbed relatively early (see a graph (1) in FIG. 10 (c)).

On the other hand, if the amount of intake air has gently increased (see a graph (2) in FIG. 10 (a)), the flow rate and pressure of exhaust gas gently increase accordingly, and besides, the upstream-side three-way catalyst 15 rises in temperature gently. Therefore, the unburnt HC that has physically been adsorbed by the upstream-side three-way catalyst 15 is relatively gently discharged from the upstream-side three-way catalyst 15 and reaches the adsorbent 172 (see a graph (2) in FIG. 10 (b)). In accordance therewith, the unburnt HC adsorbed by the adsorbent 172 starts being desorbed relatively late (see a graph (2) in FIG. 10 (c)).

Accordingly, if the amount of intake air has abruptly increased, it is preferable to correct the adsorption control period T so that the adsorption control is terminated relatively early (e.g. to correct the adsorption control period T so that the adsorption control is terminated at a timing ti in FIG. 10). If the amount of intake air has gently increased, it is preferable to correct the adsorption control period T so that the adsorption control is terminated relatively late (e.g. to correct the adsorption control period T so that the adsorption control is terminated at a timing $t_2$ in FIG. 10).

As a method of detecting a change in amount of intake air, it may be possible to utilize an output signal from the airflow meter 9, an output signal from the throttle position sensor 8, or an output signal from an intake pipe pressure sensor (not shown) for detecting a pressure in the surge tank 4.

In the exhaust gas purifier in accordance with the present invention, when the unburnt fuel components discharged from the internal combustion engine are to be adsorbed by the adsorbent, the mode in which the unburnt fuel components to be adsorbed by the adsorbent reach the adsorbent is predicted, and the timing for switching the flow passage switching means is controlled based on the predicted mode. Therefore, there is no possibility that the flow passage be switched before all the unburnt fuel components to be adsorbed by the adsorbent reach the adsorbent or that the flow passage be switched with an undue delay after all the unburnt fuel components to be adsorbed by the adsorbent have reached the adsorbent.

Thus, the exhaust gas purifier in accordance with the present invention makes it possible to effectively utilize the adsorption performance of the adsorbent. As a result, it also becomes possible to improve exhaust emission properties.

What is claimed is:

1. An exhaust gas purifier for an internal combustion engine, comprising:
   an exhaust passage connected to the internal combustion engine and partially formed of a main exhaust passage and a bypass passage bypassing, the main exhaust passage;
   an adsorbent which is disposed in the bypass passage and adsorbs unburnt fuel components in exhaust gas;

flow passage switching means for switching flow of exhaust gas to the main exhaust passage and the bypass passage;

reaching mode prediction means for predicting a mode in which unburnt fuel components reach the adsorbent from the internal combustion engine; and switching control means for controlling the flow passage switching means in accordance with the mode predicted by the reaching mode prediction means.

2. The internal combustion engine according to claim 1, further comprising:

fuel property judgement means for judging a property of fuel burnt in the internal combustion engine, wherein:

the reaching mode prediction means predicts a reaching mode of unburnt fuel components using the property of fuel judged by the fuel property judgement means as a parameter.

3. The internal combustion engine according to claim 1, further comprising:

exhaust gas purification means which is disposed in the exhaust passage upstream of the adsorbent and purifies at least unburnt fuel components contained in exhaust gas; and deterioration degree judgement means for judging a degree of deterioration of the exhaust gas purification means, wherein:

the reaching mode prediction means predicts a reaching mode of unburnt fuel components using the degree of deterioration judged by the deterioration degree judgement means as a parameter.

4. An exhaust gas purifier for an internal combustion engine, comprising:

an exhaust passage connected to the internal combustion engine and partially formed of a main exhaust passage and a bypass passage bypassing the main exhaust passage;

an adsorbent which is disposed in the bypass passage and adsorbs unburnt fuel components in exhaust gas at a temperature lower than a predetermined temperature;

flow passage switching means for switching flow of exhaust gas to the main exhaust passage and the bypass passage;

reaching mode prediction means for predicting a mode in which unburnt fuel components reach the adsorbent from the internal combustion engine;

desorption mode prediction means for predicting a mode in which the unburnt fuel components adsorbed by the adsorbent are desorbed; and switching control means for controlling the flow passage switching means in accordance with the mode predicted by the reaching mode prediction means and the desorption mode prediction means.

5. The exhaust gas purifier according to claim 4, wherein:

the, desorption mode prediction means predicts the desorption mode of the unburnt fuel components based on an amount of intake air in the internal combustion engine or an opening degree of a throttle valve disposed in an intake passage of the internal combustion engine.

* * * * *

UNITED STATES PATENT AND TRADEMARK OFFICE
CERTIFICATE OF CORRECTION

PATENT NO. : 6,370,872 B1 Page 1 of 1
DATED : April 16, 2002
INVENTOR(S) : Takashi Watanabe et al.

It is certified that error appears in the above-identified patent and that said Letters Patent is hereby corrected as shown below:

Column 1,
Line 33, change "(e.g. 300to 500º C.)" to -- (e.g. 300 to 500º C.) --.

Column 10,
Line 29, change "AID converter" to -- A/D converter --.

Column 14,
Line 53, change "upstreamn-side" to -- upstream-side --.

Signed and Sealed this

Fifth Day of November, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,370,872 B1
DATED : April 16, 2002
INVENTOR(S) : Takashi Watanabe et al.

It is certified that error appears in the above-identified patent and that said Letters Patent is hereby corrected as shown below:

<u>Column 16,</u>
Line 64, after "bypassing" delete ",".

<u>Column 18,</u>
Line 24, change "the, desorption" to -- the desorption --.

Signed and Sealed this

Fourth Day of March, 2003

JAMES E. ROGAN
*Director of the United States Patent and Trademark Office*